No. 824,154. PATENTED JUNE 26, 1906.
G. F. SHAVER.
CAKE OF SOAP.
APPLICATION FILED SEPT. 9, 1905.

Witnesses
Chas. F. Clagett
Edward F. Giddings

George F. Shaver, Inventor,
By his Attorney Lewis J. Doolittle

UNITED STATES PATENT OFFICE.

GEORGE F. SHAVER, OF NEW YORK, N. Y., ASSIGNOR TO HYGIENIC SOAP GRANULATOR COMPANY, A CORPORATION OF NEW JERSEY.

CAKE OF SOAP.

No. 824,154.      Specification of Letters Patent.      Patented June 26, 1906.

Application filed September 9, 1905. Serial No. 277,771.

*To all whom it may concern:*

Be it known that I, GEORGE F. SHAVER, a citizen of the United States, and a resident of New York, in the county of New York and State of New York, have invented certain new and useful Improvements in Cakes of Soap, of which the following is a specification.

This invention relates to a cake of soap adapted to be used in a soap shaving or granulating machine. The operation of these machines is well understood, and they usually consist of a soap-container having a rotating knife or other device for cutting or granulating the soap. The soap is placed in the container, and means are provided for holding the same against the cutter.

In the operation of the device the cake of soap is gradually cut away until only a thin portion remains. It has been found that this is very apt to break into small pieces and so clog the cutter. When the rotating cutter is used, a fin or spline is usually attached to the container, and a recess in the form of a keyway in the side of the cake of soap engages this spline and prevents the soap from rotating with the cutter. When the soap is cut away so that only a thin portion remains, the recess in this remaining portion will not hold the soap from rotating, as it will be broken away, and consequently this thin layer of soap will rotate with the cutter and prevent the same from operating on a new cake.

One object of this invention is to provide a cake of soap of such construction that it may be inserted in a machine for shaving or granulating soap such as described, and when the cake is partially used a new cake may be placed in the machine on top of the first cake, and on account of the peculiar shape of the abutting ends the two cakes will interlock and the cutter will begin to cut on the new cake before the old cake is entirely used, and, further, the remaining piece or pieces of the old cake will be held in position and prevented from rotating with the cutter on account of projections or shoulders formed on the ends of the cake, as will be more fully described hereinafter.

It is a further and more specific object of this invention to so form this cake of soap that it may be inserted in the machine with either end uppermost, and when a second cake is placed upon the top of the first cake the same will engage therewith at either end thereof. This renders it impossible to so place the soap in the machine that the engaging ends will fail to accomplish their desired purposes.

Figure 1:
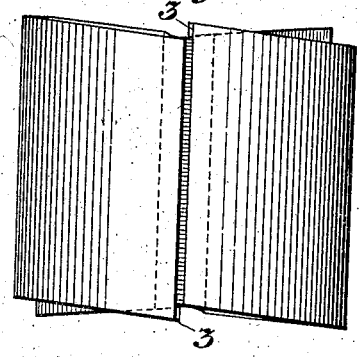
Figure 2:
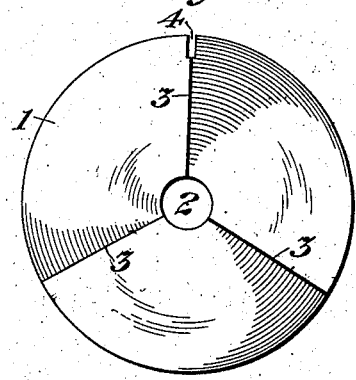
Figure 3:
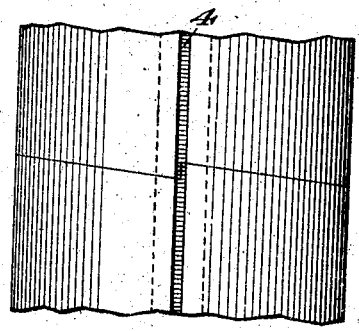

Referring now to the drawings accompanying this specification, Figure 1 is a side elevation of a cake of soap embodying my invention. Fig. 2 is a plan view of the cake of soap shown in Fig. 1. Fig. 3 is a side elevation of a portion of two cakes of soap in position, illustrating the interlocking ends of the same.

The cake of soap (shown at 1) may be of any form to adapt it for use with any desired soap shaving or granulating machine. The contour of the same will of course conform to the shape of the interior of the container with which it is to be used.

In the drawings I have illustrated a cake which is adapted to be used with a machine for shaving soap such as described in my copending application filed contemporaneously herewith.

At 2 is provided a central opening in the cylindrical cake which allows the operating-shaft to pass therethrough to the rotating cutter, which is located at the under side of the cake.

At 3 I have shown radially-extending walls formed by cutting away adjacent portions of the end of the cake at an angle with the axis thereof, as shown in Fig. 1. The size and number of these walls may be varied to suit the various requirements. The abutting walls and inclined planes leading thereto may be duplicated on opposite ends of the cake of soap and are so arranged that regardless of which way the cake is inserted into the container the adjacent ends of the old and new cake will interlock, as shown in Fig. 3, and when the old cake is nearly cut away the several remaining portions thereof will be held in position by the abutting walls of the new cake.

It will be understood that the abutments or walls on the end of the cake are formed in accordance with the direction of rotation of the cutter in such a manner that the remaining pieces of the old cake of soap will be held in position against said wall by the rotation of the cutter. In the illustration shown in the drawings the cake is adapted to be used with a cutter which rotates in a clockwise direction.

A recess or keyway 4 is provided in one side of the cake of soap and is adapted to engage a fin or spline attached to the container of the soap-shaving machine. The object of this spline and keyway is to prevent the rotation of the cake of soap with the cutter, which it will do until the cake is cut away, so that only a thin portion thereof remains, and it then becomes necessary to provide means for holding the remaining portions of the soap in position as described. This is accomplished in a very simple and effective manner in the cake of soap embodying my invention shown and described.

It will be evident that various changes may be made in the design and arrangement of the several features from the one shown in this illustration, and I do not confine myself to the exact details of the construction shown, as various modifications may be made in the form of the interlocking ends without departing from the scope of my invention.

What I claim is—

1. A cake of soap adapted for use in a soap-shaving machine, having a portion thereof adapted without deformation detachably to interlock with a corresponding portion of a second cake to retain the cake in position during the process of cutting.

2. A cake of soap adapted for use in a soap-shaving machine, having an end thereof adapted without deformation detachably to interlock with an end of a second cake to retain the cake in position during the process of cutting.

3. A cake of soap adapted for use in a soap-shaving machine, having opposite ends thereof adapted detachably to interlock with an end of a second cake to retain the cake in position during the process of cutting.

4. A cake of soap adapted for use in a soap-shaving machine, having opposite ends thereof interchangeably adapted to interlock with either end of a second cake to retain the cake in position during the process of cutting.

5. A cake of soap adapted for use in a soap-shaving machine, having an abutting wall formed at one end thereof and adapted to engage a corresponding wall on an end of a second cake to retain the cake in position during the process of cutting, said cakes being freely separable.

6. A cake of soap adapted for use in a soap-shaving machine, having a plurality of abutting walls formed at one end thereof and adapted to engage corresponding walls on a second cake to retain the cake in position during the process of cutting, said cakes being freely separable.

7. A cake of soap adapted for use in a soap-shaving machine, having a radially-extending wall adapted to engage a corresponding wall on a second cake to retain the cake in position during the process of cutting.

8. A cake of soap adapted for use in a soap-shaving machine, having a plurality of radially-extending walls adapted to engage corresponding walls on a second cake to retain the cake in position during the process of cutting.

9. A cake of soap adapted for use in a soap-shaving machine, having a radially-extending wall at each end of said cake reversibly adapted to engage a corresponding wall on the second cake to retain the cake in position during the process of cutting.

10. A cake of soap adapted for use in a soap-shaving machine, having a plurality of surfaces separated by an abutting wall and adapted to interlock with corresponding surfaces of a second cake to retain the cake in position during the process of cutting, said cakes being freely separable.

11. A cake of soap adapted for use in a soap-shaving machine, having a plurality of angular surfaces separated by an abutting wall adapted to interlock with corresponding surfaces of a second cake to retain the cake in position during the process of cutting, said cakes being freely separable.

12. A cake of soap adapted for use in a soap-shaving machine, having a plurality of surfaces separated by radially-extending walls adapted to interlock with corresponding surfaces of a second cake to retain the cake in position during the process of cutting.

13. A cake of soap adapted for use in a soap-shaving machine, having a plurality of surfaces at opposite ends of said cake of soap, said surfaces being separated by a wall and adapted to reversibly interlock with corresponding surfaces of a second cake to retain the cake in position during the process of cutting.

14. A cake of soap adapted for use in a soap-shaving machine, having a central opening therein providing for the use of a spindle operating the cutter, a portion of said cake being adapted to engage a retaining member of said machine and a portion thereof adapted to interlock with a corresponding portion of a second cake of soap to hold the cake in position during the process of cutting.

15. A cake of soap adapted for use in a soap-shaving machine, having a central opening therein providing for the use of a spindle operating a cutter, a recess at one side thereof adapted to engage a retaining member to hold the cake in position during the process of cutting.

16. A cylindrical cake of soap adapted for use in a soap-shaving machine, having a central opening therein providing for the use of a spindle operating a cutter, a recess at one side thereof adapted to engage a retaining member to hold the cake in position during the process of cutting.

17. A cake of soap adapted for use in a soap-shaving machine, having a central opening therein providing for the use of a spindle operating a cutter, a slot or keyway at one side thereof adapted to engage a spline to hold the cake in position during the process of cutting.

18. A cake of soap adapted for use in a soap-dispensing machine having means adapted without deformation detachably to engage a second cake to prevent relative movement between the cakes during the operation of the machine.

19. A cake of soap adapted for use in a soap-dispensing machine provided with a projection adapted to engage with a second cake to prevent relative movement between the cakes during the operation of the machine, said cakes being freely connectible and separable.

20. A cake of soap adapted for use in a dispensing-machine provided with an irregularity on one surface thereof adapted to interfit with a corresponding irregularity upon the surface of a second cake to prevent relative movement between the cakes during the operation of the machine, said cakes being freely connectible and separable.

21. A cake of soap adapted for use in a dispensing-machine provided with a plurality of independent abutments adapted detachably to engage with corresponding abutments upon a second cake during the operation of the machine.

22. A cake of soap adapted for use in a dispensing-machine having a depression in the surface thereof adapted to be engaged by a projection upon a second cake to prevent relative movement between said cakes during the operation of the machine, said cakes being freely connectible and separable.

23. A cake of soap adapted for use in a soap-dispensing machine provided with a plurality of abutments joined by inclined surfaces, said abutments being adapted detachably to engage with corresponding abutments upon a second cake during the operation of the machine, said cakes being freely connectible and separable.

Signed at New York, in the county of New York and State of New York, this 8th day of September, A. D. 1905.

GEORGE F. SHAVER.

Witnesses:
H. W. FORSYTH,
LEWIS J. DOOLITTJ